June 19, 1951  A. V. RAUGHT  2,557,562
DISK BEARING
Filed Sept. 10, 1945
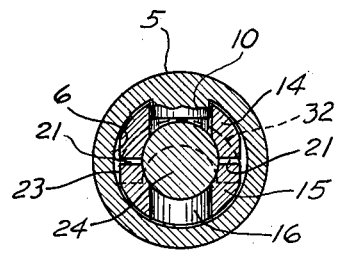
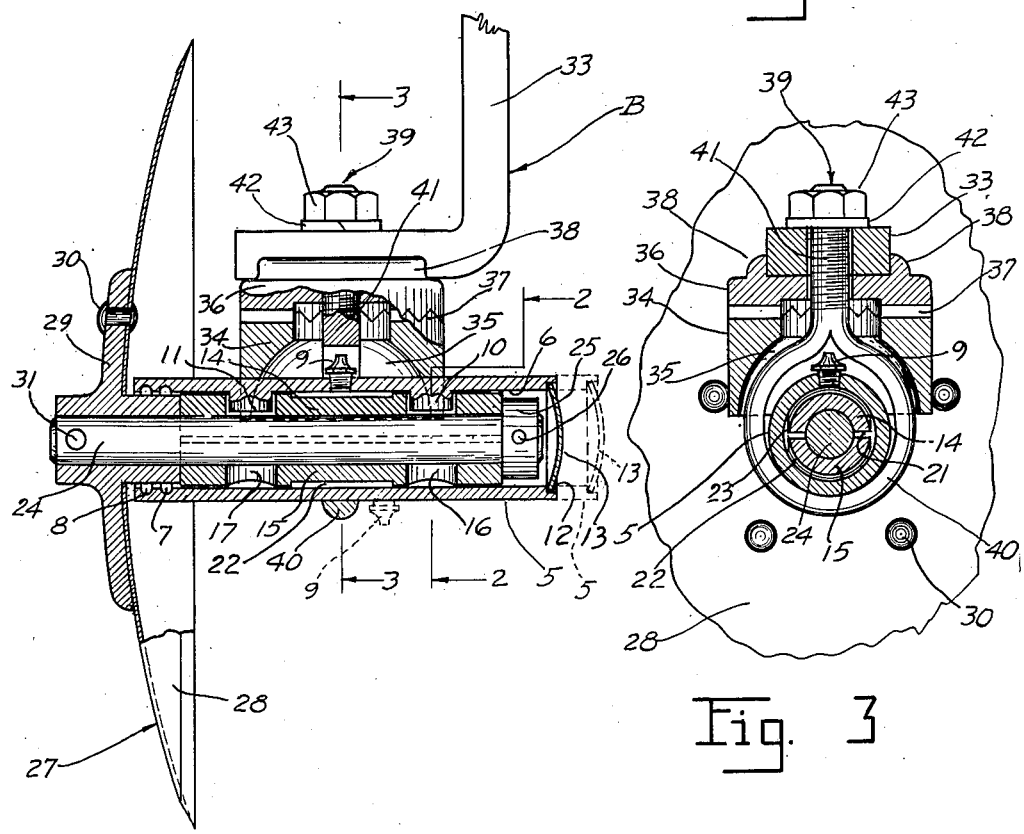
INVENTOR.
Arthur V Raught
BY
Emerson B Donnell
ATTORNEY.

Patented June 19, 1951

2,557,562

UNITED STATES PATENT OFFICE 2,557,562

DISK BEARING

Arthur V. Raught, Rockford, Ill., assignor to J. I. Case Company, Racine, Wis., a corporation of Wisconsin Application September 10, 1945, Serial No. 615,301

9 Claims. (Cl. 308—19)

This invention relates to bearings adapted for use on disc implements. More specifically, it is intended for use with furrow opening discs which use subjects the bearing to unusually severe treatment especially with respect to dirt reaching the bearing surfaces.

An object of this invention is to provide a bearing construction which prevents the entrance of dirt.

Another object is to provide a construction which is rigid and not liable to spring out of position.

Another object is to provide a means of sealing the bearing assembly so as to prevent lubricant from working out.

Another object is to provide a unit which can be readily replaced when it proves defective.

Another object is to provide a segmental bearing which will allow uniform distribution of lubricant over the full length of the bearing.

The usual form of disc bearing in use at the present has an outer shell which is usually made with an upper portion and a lower portion. These portions are bolted together and are so made that the bushing for the shaft is held between the two portions. In this type of bearing, it is found difficult to prevent dust and dirt from working into the bearing because of the joint between the parts. The price at which such implements are sold will not warrant accurately-machined surfaces which will prevent the entrance of dirt. It is also difficult to otherwise properly seal the assembly as is contemplated by this invention. The entrance of dirt obviously causes excessive wear of the bearing, and in a short time it will require replacement.

Another objection to the present type of disc implement is that when subjected to excessive strain in use, there is a tendency for the two parts to separate slightly as the bolts holding the portions together tend to loosen in service. This opening of the joint tends to allow dirt to get in and also places unnecessary localized pressure on the bearing. This condition usually results in excessive wear on the shaft and bearing and also wears them out of round.

The above mentioned bearing unit is also difficult to replace on the field without a loss of time, owing to the fact that the bearing shell often forms an integral part of the mounting brackets and therefore the whole unit must be removed so as to properly replace the bushings. To do this work on the field in the presence of dirt and dust is not very satisfactory. In the present invention the above difficulties have been eliminated as far as possible.

The present invention comprises an outer sleeve member which has no apertures on the surface except a grease fitting. The shaft for the disc carries the latter at one end of the cylindrical sleeve and the other end of the sleeve is closed against the entrance of dust by a metal disc pressed in place. It is therefore clear that this assembly will have a longer life than the bearings now available. This invention also provides an assembly which can be easily removed from the implement and replaced merely by loosening one nut. The defective unit can then be removed and a new one replaced in a comparatively short time. This unit and its mounting will be described more in detail later.

Various arrangements for the accomplishment of the above objects appear in the accompanying drawings, but it is to be understood that the invention is not limited to the details disclosed but includes all such variations and modifications as fall within the spirit of the invention as herein expressed.

Referring to the drawing in which numbers thereon refer to corresponding numbers in the description:

Figure 1 shows a section along the axis of a disc implement embodying the invention;

Figure 2 is a section at 2—2 of Figure 1;

Figure 3 is a section at 3—3 of Figure 1.

In describing the invention in detail, 5 is the outer sleeve which encloses the bearing. This sleeve 5 is cylindrical in shape in this instance, and is of a length suitable to the design of the bearing and implement. The cylindrical shape greatly facilitates mounting the implement. Sleeve 5 has no openings around the periphery that would be liable to allow entrance of dirt, the only opening being a grease fitting to be described later. Sleeve 5 is cored out with a concentric bore 6 throughout the length thereof. At one end of sleeve 5 are annular grease retaining grooves 7 and 8 which retain a sufficient amount of grease so as to prevent dirt working into the bearing from the disc side. A greasegun fitting 9 of the usual form is located about the middle of sleeve 5 and which opens into bore 6. Sleeve 5 has locking lugs 10 and 11 located in bore 6. In the present instance, there are two such locking lugs which protrude inwardly from the surface of bore 6. These locking lugs 10 and 11 may be an integral part of the casting, or may be inserted in the form of pins. These locking lugs 10 and 11 serve to prevent displacement of the bearing segments in a manner which will be described later.

One end of sleeve 5 has formed therein a recess 12. A sealing disc 13, which is spherical in shape, is pressed into recess 12 securely enough to prevent grease from working out around the edges of said disc, thus obtaining a dust proof seal. The disc 13 obviously will be placed in the recess 12 in the assembly which will be described later.

An important part of this invention comprises the method of inserting the bearing segments 14 and 15 and also the means of preventing displacement thereof. These segments in this instance, are made of iron, but can be made of wood or any other material which may be found suitable. Oil impregnated maple is sometimes used for this purpose. It is also considered an important part of the invention that these segments are so made that lubricant can flow around the periphery and through the space separating them, thus insuring that lubricant will reach all parts of the shaft. Bearing segments 14 and 15 are of such outside diameter as to fit freely within bore 6. The bearing segments 14 and 15 are provided with apertures 16 and 17, both bearing segments being identical so as to simplify manufacture. However, the apertures 16 and 17 are only necessary in the upper bearing segment, and co-operate with locking lugs 10 and 11 so as to prevent displacement of the bearing.

Bearing segments 14 and 15 have a space 21 separating the segments which is sufficiently large to allow lubricant to reach the shaft. An annular groove 22 extends around segments 14 and 15 at about the middle. This annular groove 22 conveys lubricant from the grease fitting 9 around the segments to furnish lubricant to the shaft by means of the space 21. The lubricant also reaches the shaft through apertures 16 and 17, and in addition, also reaches the shaft along the surface of the segments owing to the slight space between the segments and the bore 6. Segments 14 and 15 have flattened portions 23 at the sides so as to allow insertion of segment 14. The specific purpose of these flattened portions will be described later. Shaft 24 journals in segments 14 and 15 and protrudes beyond the ends of the latter. Shaft 24 has a collar 25 mounted at one end thereof. Collar 25 is held on shaft 24 by a pin 26 or other suitable means. The collar 25 is intended to prevent axial displacement of shaft 24 by contacting the ends of the bearing segments. A disc implement 27 comprising a disc 28 and flange 29 are held together by rivets 30 and are mounted on shaft 24. A pin or other means 31 secures disc implement 27 on shaft 24.

The assembly of the bearing element will now be described.

Bearing segment 14 is inserted into sleeve 5 as shown by dotted lines 32 of Figure 2. Flattening of the sides of bearing segments 14 and 15, as indicated by reference number 23, provides for inserting the bearing segments, in that the distance across the segment is less than the diameter of the bore 6 and allows the segment to drop in bore 6, as seen in Figs. 1 and 2, sufficiently to allow the segment 14 to clear locking lugs 10 and 11. Bearing segment 14 is inserted to the point where the apertures 16 and 17 coincide with the position of locking lugs 10 and 11. Segment 14 will then fit, when moved upwardly, about the locking lugs 10 and 11 and be prevented from being displaced. Bearing segment 15 is then inserted in bore 6 to the point where the ends of the two bearing segments coincide with each other. At this point segment 14 can no longer be displaced since it is held up by segment 15. The next step is the insertion of shaft 24.

Before insertion of shaft 24, collar 25 is mounted at the proper end of the shaft and secured by a pin or other fastening means 26. Shaft 24 is then inserted from the proper end of sleeve 5 until collar 25 contacts the ends of the bearing segments 14 and 15, this being done of course before the insertion of plug 13. The next step is to mount the disc implement 27 on the protruding end of shaft 24. After placing flange 29 on shaft 24, the fastening member 31 is inserted and fastened securely. It is apparent from the above that there is no danger of shaft 24 being displaced axially. Locking lugs 10 and 11 prevent axial displacement of bearing segment 14 and collar 25, and flange 29 being secured to shaft 24, bearing segment 15 will also be held from axial displacement by collar 25 and flange 29 on shaft 24. To complete the assembly, sealing disc 13 is pressed into place in recess 12, thus sealing the end of sleeve 5 against dirt. The unit is then ready for greasing. The grease is forced into fitting 9 and is conveyed about annular grooves 22 reaching shaft 24 through spaces 21 between bearing segments 14 and 15. Grease also is conveyed between the segments 14 and 15 and the bore 6, finding its way to shaft 24 through apertures 16 and 17 and also to the ends of segments 14 and 15, thereby lubricating collar 25 and flange 29 where they contact the bearing segments.

The mounting bracket B comprises a mounting member 33 which is secured to the implement frame in any suitable manner.

The clamping arrangement comprises a saddle member 34 having a seat portion which conforms to the sleeve 5. Saddle member 34 has a cavity 35 which accommodates the eyebolt to be described later.

A clamp ring 36 conforms to the shape of the saddle member 34. Saddle member 34 and clamp ring 36 have complementary, saw-tooth projections 37 on their contacting surfaces. These projections 37 serve to secure the saddle member 34 at a fixed angle relative to the implement. Clamp ring 36 has guide ribs 38 between which mounting member 33 is clamped. These ribs 38 serve to prevent angular displacement of the disc assembly.

An eyebolt 39 having a ring portion 40 encircles the sleeve 5 at the middle thereof and clears the grease fitting 9. Bolt 39 has a shank portion 41 which passes through saddle 34, clamp ring 36 and mounting member 33. A washer 42 and nut 43 serve to clamp the assembly as one integral unit at the desired angle.

It will be apparent from the above that when a defective disc unit is to be replaced it is merely necessary to loosen the nut 43. The unit can then be withdrawn from the eyebolt and a new one inserted. The operation is completed by merely tightening the nut 43.

It will also be apparent that loosening of nut 43 will provide for shifting of sleeve 5 endwise in saddle 34 and bolt 40. In this manner a convenient axial adjustment of the unit is provided so that proper positioning of disc 28 for the work in hand may be readily accomplished. Movement of sleeve 5 to the right, as indicated in dotted lines in Figure 1 will remove grease fitting 9 from within eyebolt 40 whereupon sleeve 5 may be rotated so that fitting 9 will be positioned outside of saddle 34 and within convenient access of a grease gun of well-known type not shown. While this adjustment would be common, it is to be noted that the particular formation of eyebolt 40 provides for axial adjustment of sleeve 5 to any position whatever within the limits of its length without interference with grease fitting 9.

The operation of the arrangement is thought to be apparent from the above description, it being pointed out that the bushings 14 and 15 and shaft 24 are inserted from one end of sleeve 5 so that it is unnecessary to provide any line of cleavage in the sleeve or any means for securing separate parts of a sleeve together. Sleeve 5 is therefore a single unbroken piece and much better adapted to resist damage or destruction in the event of the encountering of a solid object by disc 28. Prior art structures have commonly spread at the joint under these conditions. Furthermore, the lack of any projecting parts on sleeve 5 provided by making the sleeve in one piece facilitates ready axial adjustment of the sleeve relatively to saddle 34 so that the number of positions of adjustment is unlimited within the range of the length of sleeve 5.

The above being a complete description of an illustrative embodiment of the invention, what is claimed as new and desired to be secured by Letters Patent of the United States is:

1. In a bearing for use with a disc implement, the combination of a continuous outer sleeve providing an internal projection of predetermined radical extent, a bearing segment having an opening so constituted as to receive said internal projection to prevent displacement of said bearing segment, said segment having outer margins spaced inwardly from the interior of said sleeve to provide for sufficient lateral movement of said segment for said segment to clear said projection for insertion of said segment into said sleeve from one end thereof, a second bearing segment also insertable from one end of said sleeve, a shaft disposed and supported between said segments, a hub on said shaft, a collar on said shaft spaced from said hub and receiving the first segment between itself and said hub for preventing, by engagement with said first segment, endwise movement of said shaft, said hub and said collar also engaging and preventing endwise movement of the second segment, and means for sealing one end of said sleeve after insertion of said segments and shaft.

2. In a bearing for use with a disc implement, the combination of a continuous outer sleeve providing an internal projection of pre-determined radial extent, a bearing segment having an opening so constituted as to receive said internal projection to prevent displacement of said bearing segment, said segment having outer margins spaced inwardly from the interior of said sleeve to provide for sufficient lateral movement of said segment for said segment to clear said projection for insertion of said segment into said sleeve from one end thereof, a second bearing segment also insertable from one end of said sleeve, a shaft disposed and supported between said segments, a hub on said shaft, a collar on said shaft spaced from said hub and receiving the first segment between itself and said hub for preventing, by engagement with said first segment, endwise movement of said shaft, said hub and said collar engaging and preventing endwise movement of the second segment.

3. In a bearing for use with a disc implement, the combination of a continuous outer sleeve having axially spaced internal lugs, a bearing segment having apertures so constituted as to receive said lugs to prevent displacement of said bearing segment, said segment having outer margins spaced inwardly from the interior of said sleeve to provide for sufficient lateral movement of said segment for said segment to clear said projection for insertion of said segment into said sleeve from one end thereof, a second bearing segment also insertable from one end of said sleeve, a shaft disposed and supported between said segments, a hub on said shaft, a collar on said shaft spaced from said hub and receiving the first segment between itself and said hub for preventing, by engagement with said first segment, endwise movement of said shaft, said hub and said collar also engaging and preventing endwise movement of the second segment.

4. In a bearing for use with a disc implement, the combination of a continuous outer sleeve providing an internal projection of pre-determined radial extent, a bearing segment having an opening so constituted as to receive said internal projection to prevent displacement of said bearing segment, said segment having outer margins spaced inwardly from the interior of said sleeve to provide for sufficient lateral movement of said segment for said segment to clear said projection for insertion of said segment into said sleeve from one end thereof, a second bearing segment also insertable from one end of said sleeve, a shaft disposed and supported between said segments, a hub on said shaft, means secured to said shaft spaced from said hub and receiving the first segment between itself and said hub for preventing, by engagement with said first segment, endwise movement of said shaft, said hub and said collar also engaging and preventing endwise movement of the second segment.

5. In a bearing for use with a disc implement, the combination of a continuous outer sleeve providing an internal projection of predetermined radial extent, a bearing segment having an opening so constituted as to receive said internal projection to prevent displacement of said bearing segment, said segment having outer margins spaced inwardly from the interior of said sleeve to provide for sufficient lateral movement of said segment for said segment to clear said projection for insertion of said segment into said sleeve from one end thereof, a second bearing segment also insertable from one end of said sleeve, a shaft disposed and supported between said segments, axially spaced members secured to said shaft a distance apart so as to receive said first segment between said spaced members for preventing, by engagement with said first segment, endwise movement of said shaft, said axially spaced members also engaging and preventing endwise movement of the second segment.

6. In a bearing for use with a disc implement, the combination of a continuous outer sleeve providing an internal projection of pre-determined radial extent, a bearing segment having an opening so constituted as to receive said internal projection to prevent displacement of said bearing segment, said segment having an outer margin spaced inwardly from the interior of said sleeve to provide for sufficient lateral movement of said segment for said segment to clear said projection for insertion of said segment into said sleeve from one end thereof, a second bearing segment also insertable from one end of said sleeve, a shaft disposed and supported between said segments, axially spaced members secured to said shaft such a distance apart as to receive said first segment between said spaced members for preventing, by engagement with said first segment, endwise movement of said shaft.

7. In a bearing for use with a disc implement, the combination of a continuous outer sleeve providing an internal projection of pre-determined radial extent, a bearing segment having an opening so constituted as to receive said internal projection to prevent displacement of said bearing segment, said segment having outer margins so disposed in relation to the interior of said sleeve as to provide for sufficient lateral movement of said segment for said segment to clear said projection for insertion of said segment into said sleeve from one end thereof, a second bearing segment also insertable from one end of said sleeve, a shaft disposed and supported between said segments, axially spaced members secured to said shaft such a distance apart as to receive said first segment between said spaced members for preventing, by engagement with said first segment, endwise movement of said shaft.

8. A bearing assembly for use with an earth working implement comprising a one piece sleeve having an internal lug spaced intermediate the ends of said sleeve, a segmental bearing in said sleeve comprising a first and second segment, said first segment provided with an aperture spaced intermediate the ends of said segment and adapted to engage said lug so as to prevent axial and rotational displacement of said first segment, a shaft journaled in said bearing and projecting beyond the ends thereof and means secured to said shaft and abutting the ends of said first segment to prevent axial displacement of said shaft, and through said shaft of said second segment.

9. A bearing assembly for use with an earth working implement comprising a continuous sleeve having internal axially spaced lugs, a segmental bearing in said sleeve comprising a first and second segment, said first segment provided with apertures adapted to engage said lugs so as to prevent axial and rotational displacement of said first segment, a shaft journaled in said bearing and projecting beyond the ends thereof and means rotatable with said shaft and cooperating with the ends of said first segment to prevent axial displacement of said shaft and said second segment.

ARTHUR V. RAUGHT.

REFERENCES CITED

The following references are of record in the file of this patent:

UNITED STATES PATENTS

| Number | Name | Date |
| --- | --- | --- |
| 990,934 | Waterman | May 2, 1911 |
| 1,236,600 | Paul | Aug. 14, 1917 |
| 1,339,455 | Heintz | May 11, 1920 |